United States Patent [19]

Eliakim

[11] Patent Number: 4,929,075

[45] Date of Patent: May 29, 1990

[54] OPTICAL VIEWING SYSTEM

[76] Inventor: Isaac Eliakim, 23 Omri Street, Tel-Aviv, Israel

[21] Appl. No.: 387,443

[22] Filed: Jul. 31, 1989

Related U.S. Application Data

[63] Continuation of Ser. No. 63,314, Jun. 18, 1987, abandoned.

[30] Foreign Application Priority Data

Jun. 18, 1986 [IL] Israel ........................................ 79139

[51] Int. Cl.$^5$ .......................... G02C 1/00; G02B 25/00
[52] U.S. Cl. ..................................... 351/158; 351/57; 351/59; 350/146
[58] Field of Search ........................... 351/57, 59, 158; 350/133, 140, 143, 146

[56] References Cited

U.S. PATENT DOCUMENTS 3,865,468 2/1975 Holcomb ............................ 350/146
4,540,238 9/1985 Edwards ............................. 351/158

Primary Examiner—P. M. Dzierzynski
Attorney, Agent, or Firm—Fleit, Jacobson, Cohn, Price, Holman & Stern

[57] ABSTRACT

The invention relates to an optical, spectacle-type device for aiding the sight of persons who have serious vision deficiencies. The novel device makes it possible for such persons to focus at close-up, as well as at remote objects. The device comprises a spectacle frame (carrier-frame), provided with either neutral or optical lenses, in front of which (or attached to which) there is provided one or two telescopic lens-systems, there being provided a frame bearing a corrective lens or pair of lenses which can be moved so as to be in front of said telescopic lenses or removed from such position, said additional lenses changing the focal length of the entire system.

7 Claims, 4 Drawing Sheets

OPTICAL VIEWING SYSTEM

This application is a continuation of application Ser. No. 063,314, filed June 18, 1987 now abandoned.

FIELD OF THE INVENTION

There are provided means for aiding the sight of persons afflicted with serious vision deficiencies. The novel means provide an integral system for looking both at a close and remote object.

BACKGROUND OF THE INVENTION

Persons with serious sight deficiencies can be provided with spectacles comprising magnifying telescopes for looking at close objects or reading and with spectacles with telescopes for looking at distant objects, TV or blackboards. Such telescopes can be of different magnifying power. There are also spectacles suited for close working or reading with telescopes provided with caps of say −4 d, which makes possible a switch to distant observation by putting the cap on the telescope. This applies also to spectacles with telescopes for distant objects with caps of say +4 to +6 d for close reading, watchmakers, microsurgery, or working. The attachment and detachment of such caps is complicated and cumbersome, especially for persons with poor eyesight, and in binocular vision provides an intolerable double image. The present invention is adapted to provide an integrated system for looking at near and distant objects with a simple and convenient switch-over.

SUMMARY OF THE INVENTION

The new system provides comfort, clear and sharp image to a person with impaired or low vision by a rapid and easy switch-over from near to distant objects and vice-versa.

The spectacles according to the invention are provided with a levered attachment of two prismatic lenses of a desired dioptric power for binocular vision or one non-prismatic lens for monocular vision, which changes the focus as set out above, and which can be moved to the front of the existing telescopes of the spectacles so as to either increase or decrease the effective working distance of the said telescopic spectacles. The spectacles are provided with a pair of telescopic devices, one for each eye, focused at a certain distance, say for example 33 cm for close work, and with a magnification of from about 1.4 to 4. The working distance varies from case to case, but for close work it generally varies from 15 to 60 cm. The angular alignment of the two telescopes should be taken into consideration so as to focus both eyes at the same point. When such spectacles are worn and the user wants to change over to a distance, say up to 6 meters, he simply moves the lever and thus positions before each of the telescopes an optical lens with prismatic effect of say −3.0 d to about −6.0 d which results in the desired sharp vision at the desired distance. The prismatic effect of the lenses is obligatory to binocular vision in order to make it comfortable and avoid double image. This rule does not necessarily apply to monocular vision. The invention is illustrated with reference to the enclosed schematical drawings which are not according to scale, and wherein:

Figure 1:
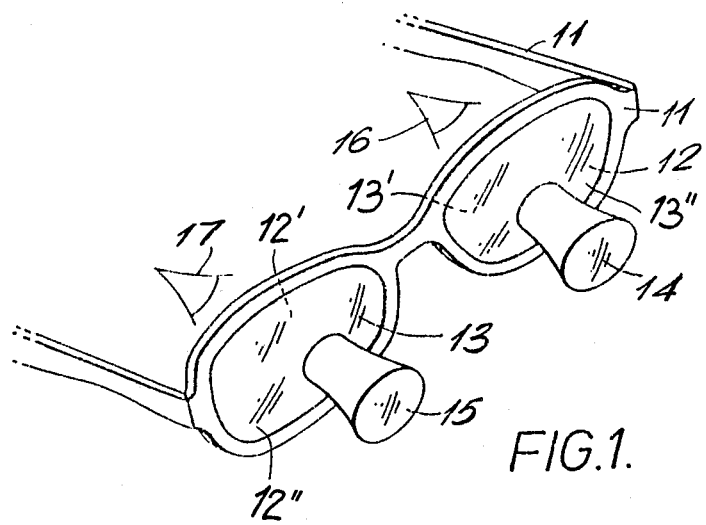
FIG. 1 is a perspective view of spectacles provided with telescopes.
Figure 2:
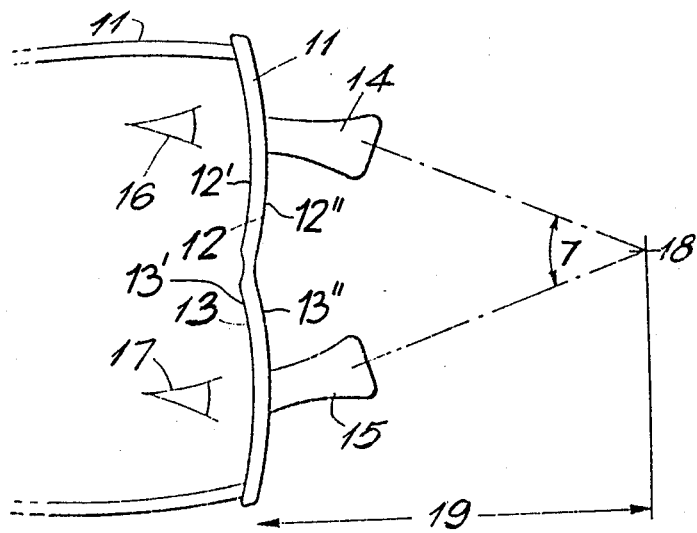
FIG. 2 illustrates the working parameters of the spectacles of FIG. 1.
Figure 3:
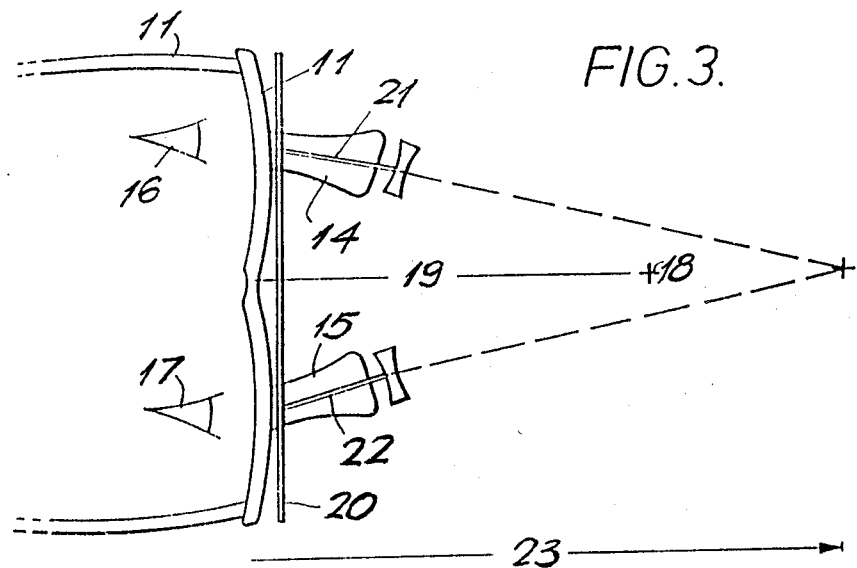
FIG. 3 is a top view of spectacles provided with the attachment of the invention.

As set out in FIG. 1, telescopic spectacles for persons with impaired vision comprise a frame 11, optical or neutral lenses 12 and 13, telescopes 14 and 15, for the left and right eyes respectively. As shown in FIG. 1, the lenses 12 and 13 each have an inner surface 12' and 13' and an outer surface 12'' and 13'' respectively with the telescopes 14 and 15 attached to the outer surfaces 12'' and 13'', respectively. The components of FIG. 2 are numerated in the same manner, the vision of eyes 16 and 17 are focused on point 18 which is at a distance 19 from the plane of the spectacles. As shown in FIG. 3, where the same designations are used, the bar 20 is provided with levered members 21 and 22, carrying each a prismatic negative lens, which increases the focal length from 19 to 23.

Figure 4:
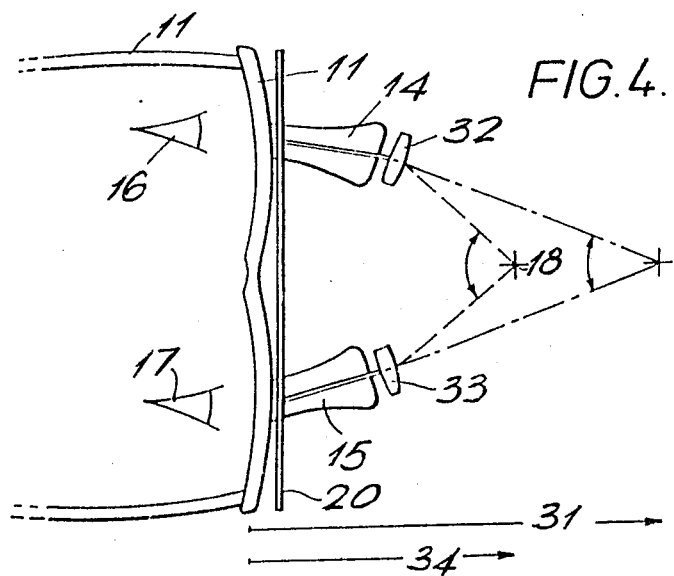
FIG. 4 is a top view of the spectacles provided with the attachment according to the invention.

The device of FIG. 4 is similar to that of FIG. 3, but here the telescopes are adjusted for distance 31 and the provision of the two positive prismatic lenses 32 and 33, when positioned in front of the telescopic members 14 and 15, decrease the focal length distance 34. The levered prismatic lenses are easily moved to the position where they are in front of the telescopes and they are also moved with ease upwards, so that they are out of the line of sight.

The carrier of the prismatic lenses is of simple and inexpensive construction and the lever permits an easy movement of the lenses from one position to the other.

Figure 5:
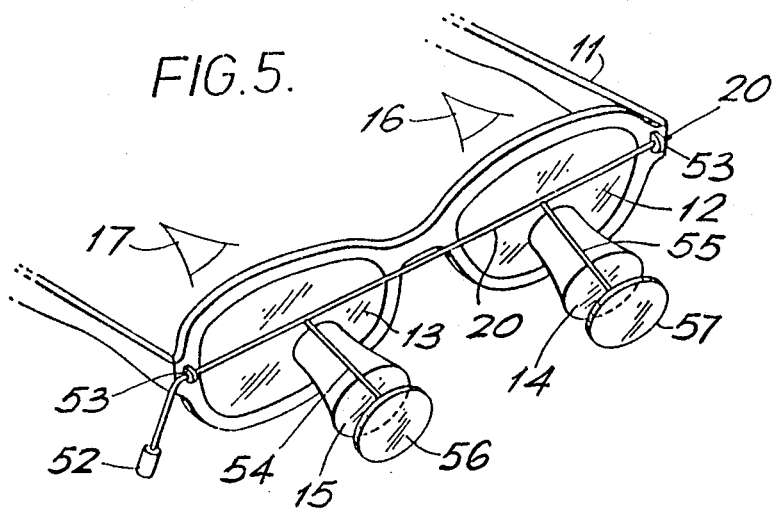
FIG. 5 is a perspective view of spectacles of the invention.
Figure 6:
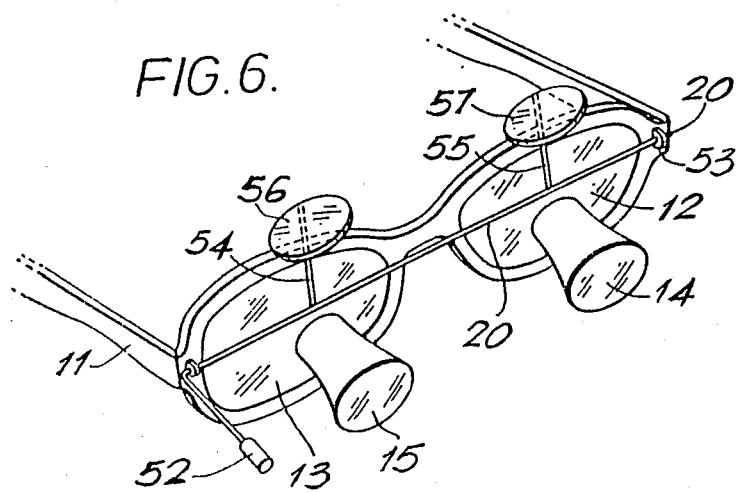
FIG. 6 is a view of the spectacles of FIG. 5 with the hinged lens-pair removed from the optical path.

The attachment of the invention is illustrated in detail in FIG. 5 and FIG. 6, where in FIG. 5 the attachment is in position in front of the telescopes, and in FIG. 6 - moved upwards - out of the line of the optical axis of the telescopes. The levered attachment comprises the Bar 20, which can be a cylindrical member with bent-over section 52, said Bar 20 passing through part of the spectacle frame 53, so as to be ratably mounted in the frame. From Bar 20 extend at a nealy right angle, two straight bars 54 and 55, each of which carries a frame member 56 and 57 respectively, which holds the prismatic lenses, so that by turning the lever member 52 the lenses are brought from the position shown in FIG. 5 to that of FIG. 6. The two eyes form a certain angle and focus on an indicated point. When this angle is big (for looking at close objects), the use of negative prismatic lenses will increase the focal length and the angle, of course, decreases.

Figure 7:
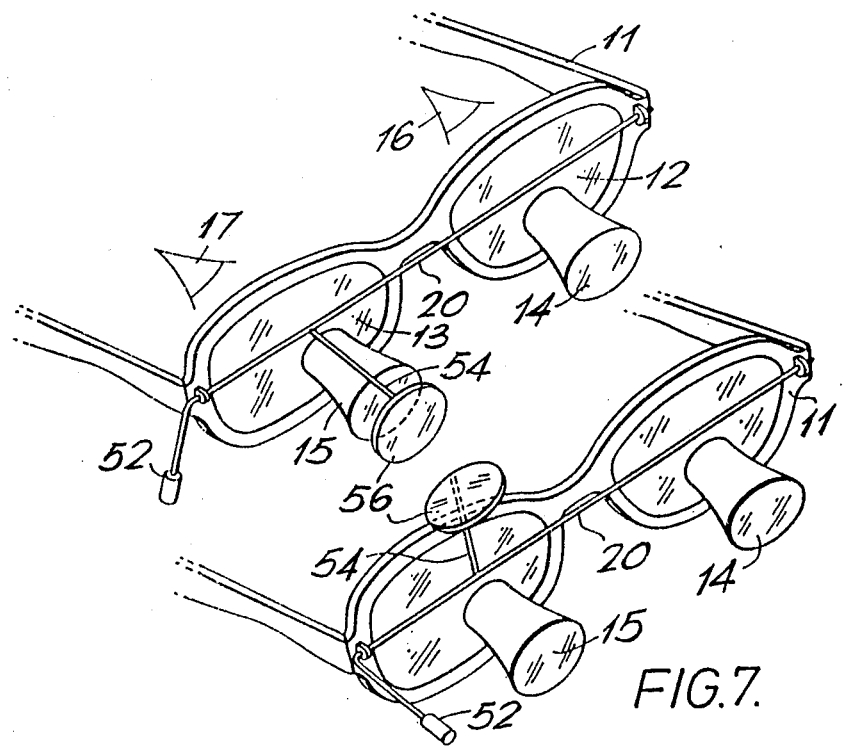
FIG. 7 illustrates an optical system in two views, with a single hinged view in the optical path and removed from this path.
Figure 8:
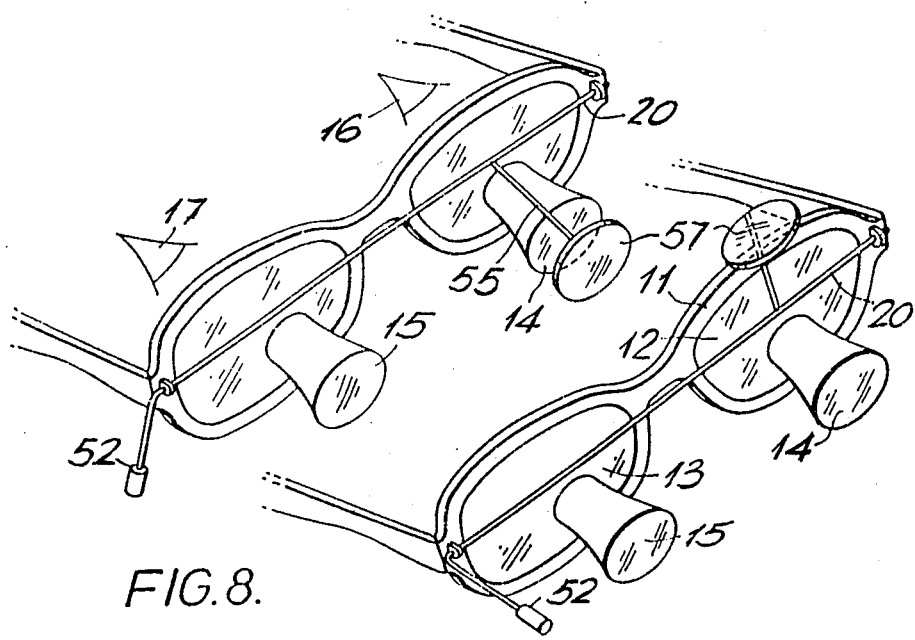
FIG. 8 illustrates a system similar to that of FIG. 8.

The invention also relates to an optical system as illustrated with reference to FIGS. 7 and 8. In these there are shown similar components, with the difference being that only one removable lens is provided in the hinged frame in front of the telescopic systems. Thus, the system with the lens carried by the removable lens out of the optical path, is focused at a predetermined distance, and when the lens is moved to be in front of one of the telescopic systems, the effective focal length of the telescope in front of which the added lens is positioned may be decreased or increased by such lens, as required.

The magnification of the telescopes and their focal length, as well as that of the optical system comprising the added lenses can be predetermined at will and allows for a rather large range of observation distances.

The novel optical system replaces the cumbersome caps and makes it possible for the user to switch instantly from one distance to another, which means from working or reading distance to a one image sharp far point, or vice-versa.

The invention is illustrated with reference to the following examples:

EXAMPLE 1

An optical system of the invention was prepared for a near-sighted person of $-5$ d. The spectacles had lenses of $-5$ d, and these were equipped with magnifying telescopes having a magnification factor of 2 $\times$, giving a sharp vision at a distance of about 300 cm. In order to make possible a change-over to a working distance of 30 to 40 cm there were provided prismatic lenses in the removable frame which can be moved to be in front of the telescope systems, each of such lenses being of 10 prisms base out and of $+5$ d.

EXAMPLE 2

An optical system was provided for a near-sighted person of $-5$ d. The spectacle carrier frame was provided with $-5$ d lenses. To provide sharp vision at about 30 to 40 cm, there were provided magnifying telescopes of 4 $\times$, and in order to change over to a sharp vision at about 250 to 300 cm the removable frame was equipped with $-7$ d lenses, 5 prisms base out.

EXAMPLE 3

An optical system was provided for a farsighted person of $+2$ d. The carrier frame was provided with $+2$ d lenses and there were provided two telescope systems of magnification 2.5 $\times$ each attached to said lenses providing a sharp vision at a distance of about 250–300 cm. In order to change over to 30–40 cm distance, the frame was provided with a lens-pair of $+4.5$ d of 8 prisms, base in which gave the required sharp vision at the desired distance.

I claim:

1. An optical spectacle-type device for use by persons suffering from substantial deficiencies of sight, comprising:

a conventional spectacle frame equipped with corrective optical lenses, correcting the acuity of vision, each lens having an inner surface and an outer surface with the inner surfaces of the lenses being positionable adjacent an eye of the person;

a telescopic lens system being attached in front of each lens to the outer surface of said lens, said telescopic lenses focused at a common focus at a predetermined distance from the spectacle frame to provide a sharp vision at a first distance from the viewer; and a further frame being hingedly attached to said spectacle frame, said further frame having two prismatic lenses and a lever to move the two prismatic lenses in front of the telescopic systems to change the focal length of the entire system to provide a sharp vision at a second distance from the viewer, said lever also serving to remove the two prismatic lenses from in front of each of the telescopic systems so that a sharp vision is again provided at the first distance from the viewer.

2. Spectacles according to claim 1, where said further frame includes a bar having a bent-over section, said bar passing through part of the spectacle frame so as to be rotatably mounted in the frame, whereby movement of the bent-over section in one direction rotates the bar to move the prismatic lenses in front of the telescopic lens systems and movement of the bent-over section in another direction rotates the bar to remove the prismatic lenses from in front of the telescopic lens systems.

3. Spectacles according to claim 5, where said bar includes two straight bars, with each of the straight bars carrying a frame member, whereby said frame members each holds one of the prismatic lenses.

4. Spectacles according to claim 1, wherein the first set of telescope systems provides a sharp vision at a relatively short distance from the viewer, and the prismatic lenses are negative resulting in a substantially longer focal length of the combined optical system.

5. Spectacles according to claim 1, where the telescope systems provide a sharp vision at a comparatively large distance, and where added positive prismatic lenses result in a sharp focus at a close range.

6. Spectacles according to claim 1, where the near distance is predetermined in the region of about 15 to 80 cm, and where the far distance is in the range of a few meters.

7. An optical system according to claim 1, with the modification that a removable optical lens is provided only for one of the telescopic systems.

* * * * *